(12) United States Patent
Tsorng et al.

(10) Patent No.: US 11,971,135 B2
(45) Date of Patent: Apr. 30, 2024

(54) POLE MOUNT, POLE MOUNT KIT, AND POLE MOUNT ASSEMBLY

(71) Applicant: Quanta Computer Inc., Taoyuan (TW)

(72) Inventors: Yaw-Tzorng Tsorng, Taoyuan (TW); Ming-Lung Wang, Taoyuan (TW); Jai-Lin Liu, Taoyuan (TW); Kai-Hsiang Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/932,617

(22) Filed: Sep. 15, 2022

(65) Prior Publication Data
US 2024/0093829 A1 Mar. 21, 2024

(51) Int. Cl.
*F16M 13/02* (2006.01)
(52) U.S. Cl.
CPC ................................ *F16M 13/022* (2013.01)
(58) Field of Classification Search
CPC ............ F16M 13/022; F16L 3/10; F16B 7/04
See application file for complete search history.

(56) References Cited

U.S. PATENT DOCUMENTS

| | | | | |
|---|---|---|---|---|
| 4,813,639 A * | 3/1989 | Midkiff | ..................... | H01Q 1/00 174/148 |
| 4,852,848 A * | 8/1989 | Kucera | ................... | F16F 7/104 188/380 |
| 5,184,911 A * | 2/1993 | Wu | ......................... | B62B 5/085 280/DIG. 6 |
| 5,193,774 A * | 3/1993 | Rogers | ..................... | H02B 5/02 248/219.4 |
| 5,320,312 A * | 6/1994 | Hoenninger | ............ | F16L 3/227 248/68.1 |
| 5,601,274 A * | 2/1997 | Minor | ................... | F21V 21/116 362/431 |
| 6,527,240 B1 * | 3/2003 | Huang | ............... | A47G 23/0225 248/231.41 |
| 6,575,652 B2 * | 6/2003 | Krauss | .................... | F16D 1/087 403/396 |

(Continued)

FOREIGN PATENT DOCUMENTS

SE 9804568 A * 6/2000 ............. F16B 2/065

OTHER PUBLICATIONS

Copy used by Examiner of SE-9804568-A (Year: 2000).*

*Primary Examiner* — Monica E Millner
(74) *Attorney, Agent, or Firm* — NIXON PEABODY LLP

(57) ABSTRACT

Pole mounts, pole mount kits, and poly mount assemblies are disclosed. Each kit and assembly includes a pole mount with a mounting bracket including a pair of coupling plates and at least one retaining plate. The pair of coupling plates is coupled to opposite ends of the at least one retaining plate. The at least one retaining plate defines a mounting area between the pair of coupling plates. The pole mount further includes at least two retaining brackets coupled to the at least one retaining plate. Each of the retaining brackets includes a base, opposing side walls extending from the base, and a front wall extending from the base and located between the opposing side walls. The base, the opposing side walls, and the front wall define a retaining area. The front wall defines a cutout region contiguous with the retaining area.

20 Claims, 5 Drawing Sheets

(56) References Cited

U.S. PATENT DOCUMENTS

| | | | | |
|---|---|---|---|---|
| 6,739,561 B2* | 5/2004 | Herzog | ............... | H01Q 1/125 |
| | | | | 248/218.4 |
| 7,106,273 B1* | 9/2006 | Brunson | ............... | H01Q 1/246 |
| | | | | 343/890 |
| 8,336,837 B2* | 12/2012 | Gephart | ............... | F16B 2/12 |
| | | | | 248/229.12 |
| 11,674,636 B1* | 6/2023 | Li | ............... | F16M 13/022 |
| | | | | 248/231.61 |
| 11,698,087 B2* | 7/2023 | Tsorng | ............... | F16B 5/0685 |
| | | | | 343/890 |
| 11,754,202 B2* | 9/2023 | Guiraud | ............... | F16L 3/1016 |
| | | | | 248/65 |
| 2003/0042375 A1* | 3/2003 | Sperry | ............... | F21V 21/116 |
| | | | | 248/218.4 |
| 2006/0291951 A1* | 12/2006 | Van Zile | ............... | B25J 15/0052 |
| | | | | 403/54 |
| 2012/0026065 A1* | 2/2012 | Lo | ............... | H01Q 1/1228 |
| | | | | 343/890 |
| 2016/0152172 A1* | 6/2016 | Eboli | ............... | F16M 13/022 |
| | | | | 248/230.5 |
| 2016/0312951 A1* | 10/2016 | Zhai | ............... | H05K 7/18 |
| 2021/0075083 A1* | 3/2021 | Udagave | ............... | F16M 13/022 |
| 2022/0037758 A1* | 2/2022 | Kim | ............... | H01Q 3/08 |

* cited by examiner

POLE MOUNT, POLE MOUNT KIT, AND POLE MOUNT ASSEMBLY

FIELD OF THE INVENTION

The present invention relates generally to a device for mounting objects to a structure, and more specifically, to a mount, a kit, and an assembly for mounting objects to a pole.

BACKGROUND OF THE INVENTION

Telecommunications networks typically require many objects, such as transceivers, coupled to structure, such as poles, for establishing the network within an area. Assemblies exist for coupling an object to a pole. However, coupling more than one object to a structure requires coupling multiple assemblies to the structure, because a single assembly can only hold one or two objects. Requiring multiple assemblies for coupling more than two objects to a structure adds complexity and a number of components that creates issues. Thus, a need exists for a single assembly that can handle coupling more than two objects to a structure.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a pole mount is disclosed. The pole mount includes a mounting bracket having a pair of coupling plates and at least one retaining plate. The pair of coupling plates are coupled to opposite ends of the at least one retaining plate. The at least one retaining plate defines a mounting area between the pair of coupling plates. The pole mount further includes at least two retaining brackets coupled to the at least one retaining plate. Each of the retaining brackets includes a base, opposing side walls extending from the base, and a front wall extending from the base. The front wall is located between the opposing side walls. The base, the opposing side walls, and the front wall define a retaining area. The front wall defines a cutout region contiguous with the retaining area.

According to certain further aspects, each of the retaining brackets includes a projection extending into the retaining area. The projection includes an aperture for accepting a fastener. According to certain further aspects, the aperture is on a top face of the projection, the top face facing away from the base. According to certain further aspects, the at least one retaining plate includes two retaining plates coupled together at first ends thereof and coupled to respective ones of the pair of coupling plates at second ends thereof. According to certain further aspects, the two retaining plates are coupled together at a 90° angle at the first ends. According to certain further aspects, the pair of coupling plates are coplanar. According to certain further aspects, each of the coupling plates includes an aperture for accepting a fastener therethrough.

According to certain aspects of the present disclosure, a pole mount kit is disclosed. The pole mount kit includes a pair of pole mounts. Each of the pole mounts includes a mounting bracket including a pair of coupling plates and at least one retaining plate. The pair of coupling plates is coupled to opposite ends of the at least one retaining plate. The at least one retaining plate defines a mounting area between the pair of coupling plates. Each pole mount further includes at least two retaining brackets coupled to the at least one retaining plate. Each of the retaining brackets includes a base, opposing side walls extending from the base, and a front wall extending from the base and located between the opposing side walls. The base, the opposing side walls, and the front wall define a retaining area. The front wall defining a front wall cutout region contiguous with the retaining area. The pole mount kit further includes four object brackets. Each of the four object brackets includes a back configured to cooperatively fit within the retaining area of one of the retaining brackets and includes an extension configured to cooperatively fit within and extend through the front wall cutout region of the one of the retaining brackets, with the object bracket seated in the one of the retaining brackets. The extension includes an aperture to accept an object fastener for fastening an object to the object bracket.

According to certain further aspects, each of the retaining brackets includes a projection extending into the area. The projection includes a projection aperture to accept an object fastener. The back of each of the object brackets includes an object bracket cutout region that accepts the projection of one of the retaining brackets with the object bracket coupled to the one of the retaining brackets. According to certain further aspects, the back of each of the four object brackets includes a frame. A first side of the frame includes the object bracket cutout region. A second side of the frame, opposite the first side, includes an object bracket aperture to accept the object fastener. According to certain further aspects, the projection aperture is on a top face of the projection, which faces away from the base. According to certain further aspects, the at least one retaining plate of each of the pole mounts includes two retaining plates coupled together at first ends thereof. The two retaining plates are coupled to respective ones of the pair of coupling plates at second ends thereof. According to certain further aspects, the two retaining plates of each of the pole mounts are coupled together at a 90° angle at the first ends. According to certain further aspects, the pair of coupling plates of each of the pole mounts are coplanar. According to certain further aspects, each coupling plate of the coupling plates for each of the pole mounts includes a coupling plate aperture for accepting a fastener therethrough.

According to certain aspects of the present disclosure, a pole mount assembly is disclosed. The pole mount assembly includes a pair of pole mounts. Each of the pole mounts include a mounting bracket including a pair of coupling plates and at least one retaining plate. The pair of coupling plates being on opposite ends of the at least one retaining plate. The at least one retaining plate defining a mounting area between the pair of coupling plates. At least two retaining brackets are coupled to the at least one retaining plate. Each of the retaining brackets include a base, opposing side walls extending from the base, and a front wall extending from the base and located between the opposing side walls. The base, the opposing side walls, and the front wall define a retaining area. The front wall defines a front wall cutout region contiguous with the retaining area. The pole mount assembly further includes four object brackets. Each of the four object brackets include a back configured to cooperatively fit within the retaining area of one of the retaining brackets. Each of the four object brackets include an extension configured to cooperatively fit within and extend through the front wall cutout region of one of the retaining brackets, with the object bracket seated in the one of the retaining brackets. The extension includes an aperture to accept an object fastener for fastening an object to the object bracket. The pole mount assembly further includes four objects. Each of the four objects being coupled to a separate one of the four object brackets. The pair of pole mounts are coupled to each other on opposite sides of a pole.

According to certain further aspects, the pole mount assembly further includes two pairs of nuts and bolts. Each pair of the nuts and bolts coupling together opposing coupling plates of the pair of pole mounts around the pole. According to certain further aspects, the pole mount assembly further includes a plurality of the object fastener, with each object fastener fastening one of the four objects to the separate one of the four object brackets. According to certain further aspects, the pole mount assembly further includes a plurality of coupling plate fasteners, with each coupling plate fastener coupling one of the four object brackets to a separate one of the retaining brackets. According to certain further aspects, the at least one retaining plate of each of the pair of pole mounts includes two retaining plates coupled together at first ends thereof and coupled to respective ones of the pair of coupling plates at second ends thereof. The pole is positioned within an area formed by the retaining areas of the pair of pole mounts.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
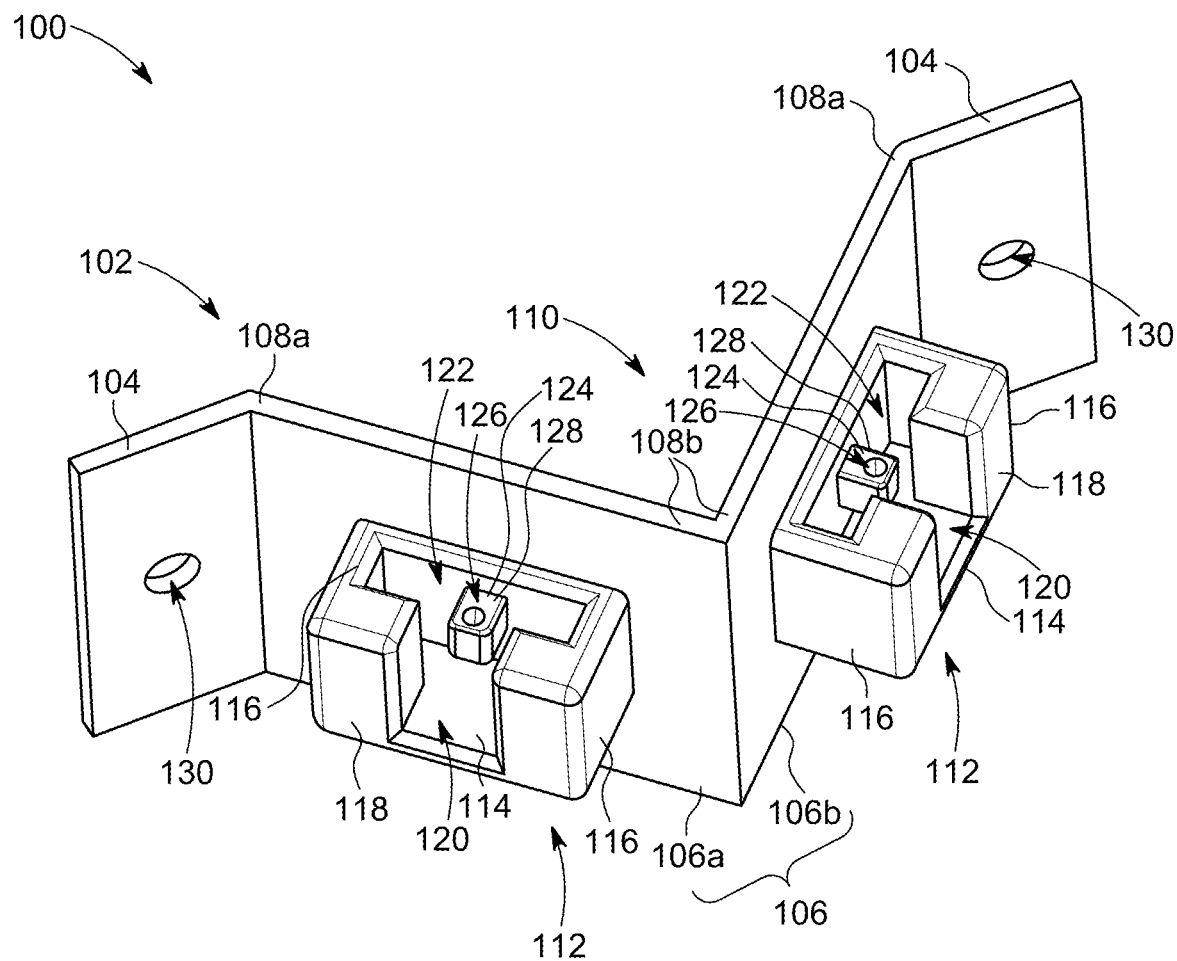
FIG. 1 is a perspective view showing a pole mount, according to certain aspects of the present disclosure.

The present disclosure describes pole mounts, pole mount kits, and pole mount assemblies for coupling objects to a structure, such as a pole. The objects can be various different objects with various different purposes for being coupled to the structure. According to some aspects, the objects can be telecommunications object that are coupled to structure for establishing part of a telecommunications network. For example, the objects can be remote radio units (RRUs) in a telecommunications network. A single pole mount assembly can be used to couple one, two, three, or even four RRUs to a pole, without the need couple additional structure directly to the pole. Instead, each object can couple to an object bracket of the pole mount assembly.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Referring to FIG. 1, a perspective view is shown of a pole mount 100, according to certain aspects of the present disclosure. The pole mount 100 includes a mounting bracket 102. The mounting bracket 102 includes a pair of coupling plates 104 and at least one retaining plate 106. According to some implementations, the pair of coupling plates 104 are coplanar. However, the orientation of the coupling plates 104 can vary depending on the orientation of the pole mount 100 in use. The pair of coupling plates 104 are coupled to opposite ends 108a of the at least one retaining plate 106.

The at least one retaining plate 106 defines a mounting area 110 between the pair of coupling plates 104. According to some implementations, the at least one retaining plate 106 include two retaining plates 106a and 106b coupled together at first ends 108a thereof (e.g., the opposite ends) and coupled to respective ones of the pair of coupling plates 104 at second ends 108b thereof. As shown in FIG. 1, the two retaining plates 106a and 106b can be coupled together at a 90° angle at the first ends 108b.

The pole mount 100 further includes at least two retaining brackets 112 coupled to the at least one retaining plate 106. Each of the two retaining brackets 112 includes a base 114, opposing side walls 116 extending from the base 114, and a front wall 118 extending from the base 114 and located between the opposing side walls 116. The front wall 118 defines a cutout region 120 contiguous with a retaining area 122 defined by the base 114, the opposing side walls 116, and the front wall 118. Each of the retaining brackets 112 further includes a projection 124 extending into the retaining area 122. The projection 124 includes an aperture 126 to accept a fastener. The aperture 126 is on atop face 128 of the projection 124. The top face 128 faces away from the base 114.

According to some implementations, the coupling plates 104 include apertures 130 for accepting a fastener therethrough, as further discussed with respect to FIG. 5 below. However, the coupling plates 104 can have various other features for connecting to structure, such as a some form of projection.

Figure 2:
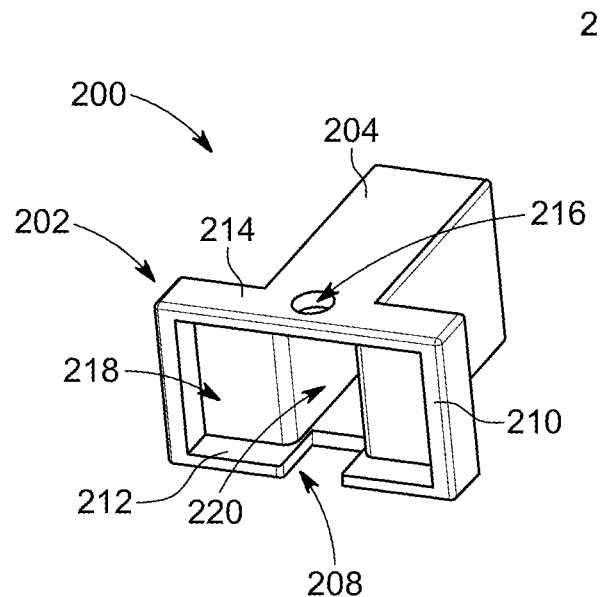
FIG. 2 is a perspective view showing an object bracket, according to certain aspects of the present disclosure.
Figure 3:
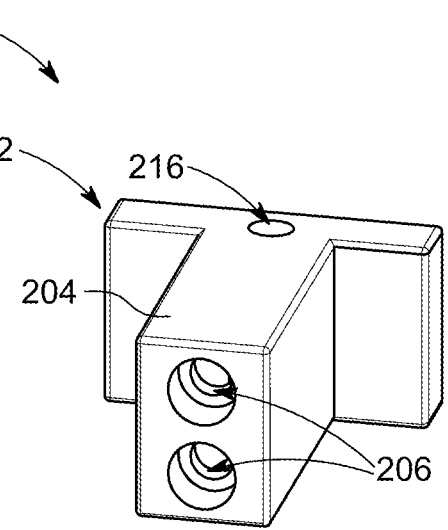
FIG. 3 is another perspective view showing the object bracket of FIG. 2, according to certain aspects of the present disclosure.
Figure 4:
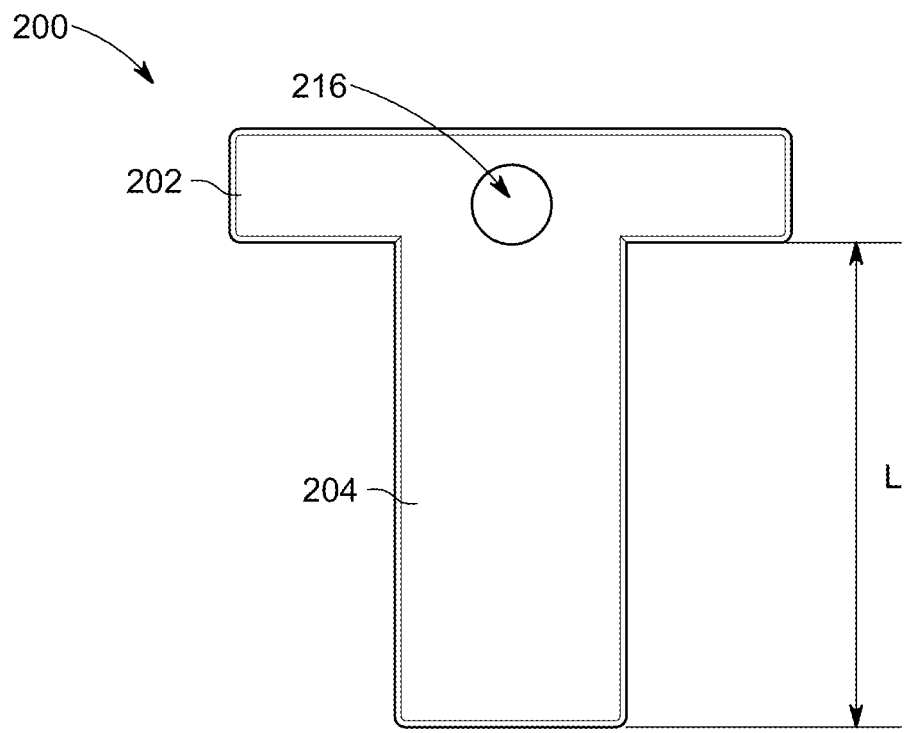
FIG. 4 is a top view showing the object bracket of FIG. 2, according to certain aspects of the present disclosure.

FIG. 2 is a perspective view showing an object bracket 200, according to certain aspects of the present disclosure. FIG. 3 is another perspective view showing the object bracket 200 of FIG. 2, according to certain aspects of the present disclosure. FIG. 4 is a top view showing the object bracket 200 of FIG. 2, according to certain aspects of the present disclosure. The object bracket 200 includes a back 202 configured to cooperatively fit within the retaining area 122 of one of the retaining brackets 112 (FIG. 1). The object bracket 200 further includes an extension 204 configured to cooperatively fit within and extend through the front wall cutout region 120 of a retaining bracket 112 (FIG. 1), with the object bracket 200 seated in the retaining bracket 112.

Referring specifically to FIG. 3, the extension 204 includes two apertures 206 that accept an object fastener for fastening an object to the object bracket 200, as further discussed with respect to FIGS. 7 and 8 below. However, the extension 204 can instead have only one aperture 206 or have more than two apertures 206.

Referring specifically to FIG. 2, according to some implementations, the back 202 of the object bracket 200 includes an object bracket cutout region 208 that accepts the projection 124 of a retaining bracket 112 with the object bracket 200 coupled to the retaining bracket 112.

According to some implementations, the back 202 of the object bracket 200 includes a frame 210. A first side 212 of the frame 210 includes the object bracket cutout region 208. A second side 214 of the frame 210, opposite the first side 212, includes an object bracket aperture 216 that accepts an object fastener, as further discussed with respect to FIG. 9 below.

According to some implementations, the frame 210 in the back 202 can further outline a recessed portion 218 of the object bracket 200. The recessed portion 218 in the object bracket 200 can further reduce the weight of the object bracket 200.

The extension 204 includes a hollow portion 220 to allow a fastener to extend through the extension 204 and out of the apertures 206 for coupling the object bracket 200 to an object, as discussed further below with respect to FIGS. 7 and 8.

Referring to FIG. 4, the extension 204 has a length L. The length L can vary depending on the size of an object that is coupled to the object bracket 200, as further discussed with respect to FIGS. 7 and 8 below. According to some implementations, the length L can be about 25 to about 35 millimeters (mm), such as 30 mm.

Figure 5:
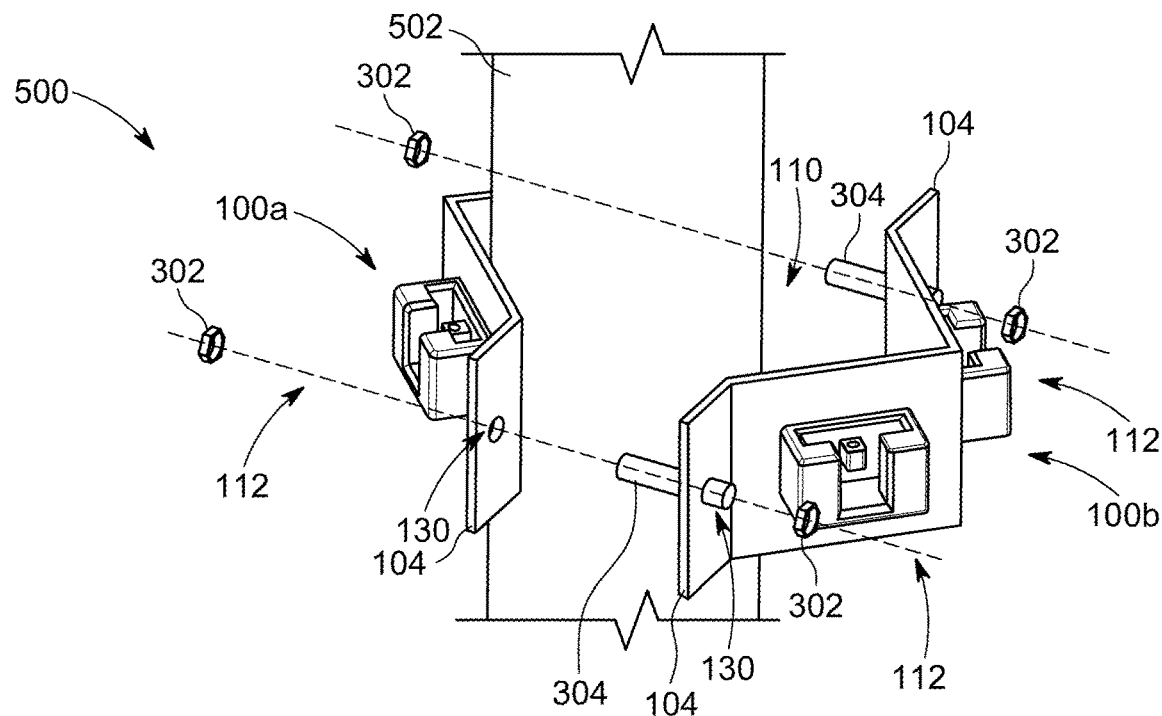
FIG. 5 is an exploded perspective view showing a pair of pole mounts of a pole mount kit coupled to a pole, according to certain aspects of the present disclosure.
Figure 6:
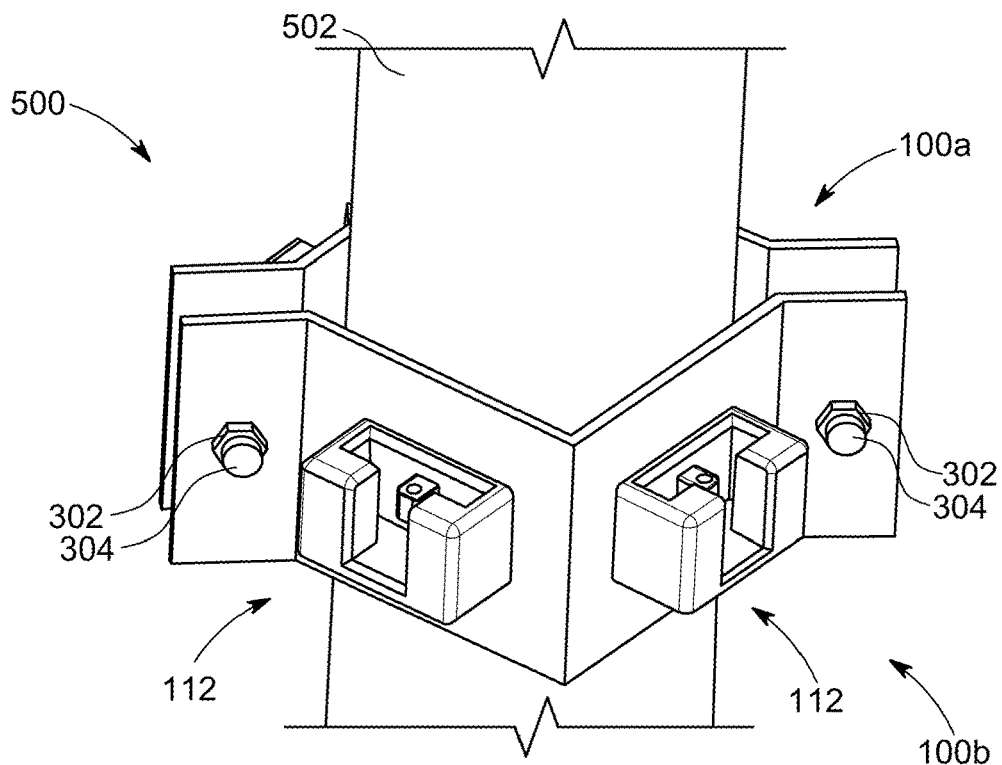
FIG. 6 is a perspective view showing the pair of pole mounts of a pole mount kit coupled to a pole, according to certain aspects of the present disclosure.

FIG. 5 is an exploded perspective view showing a pair of pole mounts 100a and 100b of a pole mount kit 500 coupled to a pole 502, according to certain aspects of the present disclosure. FIG. 6 is a perspective view showing the pair of pole mounts 100a and 100b of the pole mount kit 500 coupled to the pole 502, according to certain aspects of the present disclosure. Each pole mount 100a and 100b of the pair is identical to pole mount 100 discussed above; hence the same base element number. However, the each pole mount 100a and 100b can vary from the pole mount of FIG. 1 above according to the various aspects discussed above.

The pole mount 100a couples to the pole mount 100b by opposing coupling plates 104 interfacing with each other. Further, nuts 302 retain bolts 304 inserted through the apertures 130 for each opposing pair of the coupling plates 104. The nuts 302 are tightened to keep the opposing coupling plates 104 together, which further maintain the opposing mounting brackets 102 of the pole mounts 100 together. Thus, the nuts 302 and the bolts 304 apply an interference fit through clamping force for the pair of mounting brackets 102 of the pole mounts 100a and 100b around the pole 502. The pole 502 is retained within the combined mounting areas 110 of the pole mounts 100a and 100b.

As a result of the two pole mounts 100a and 100b coupled to the pole 502, there are four retaining brackets 112 coupled to the pole 502 from which to mount objects on to the pole 502, as discussed further below with respect to FIGS. 7-10. The two pole mounts 100a and 100b can be coupled to poles of varying sizes by using bolts of varying sizes, or a bolts of a single size that accommodates poles with varying diameters.

Figure 7:
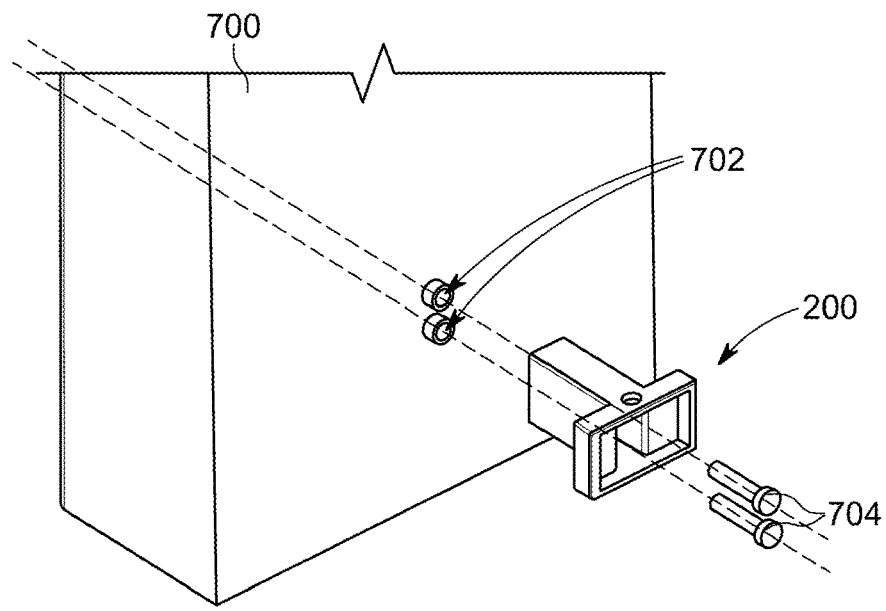
FIG. 7 is an exploded perspective view showing an object bracket coupled to an object, according to certain aspects of the present disclosure.
Figure 8:
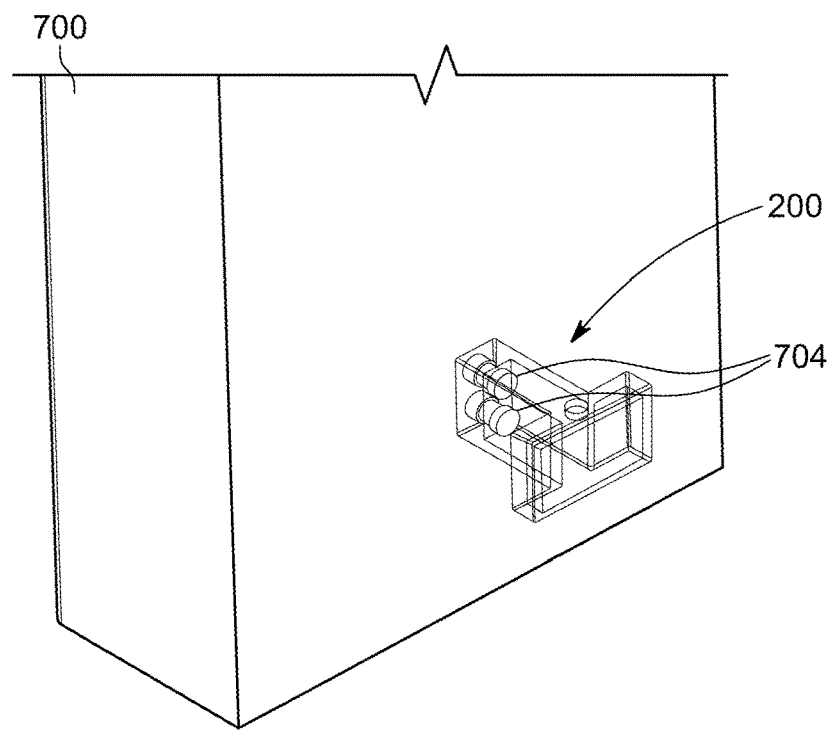
FIG. 8 is a perspective view showing the object bracket coupled to the object of FIG. 7, according to certain aspects of the present disclosure.

FIG. 7 is an exploded perspective view showing an object bracket 200 coupled to an object 700, according to certain aspects of the present disclosure. Specifically, the object 700 can include two object apertures 702 that are positioned on the object 700 for coupling an object bracket 200 to the object 700. For example, the object bracket 200 can align with the object apertures 702 to allow fasteners 704, such as nails, screws, bolts, etc., to extend through the object bracket 200 and interface with the object apertures 702 for coupling the object bracket 200 to the object 700. More specifically, the fasteners 704 can pass through the hollow portion 220 of the object bracket 200 to access the object apertures 702.

Although FIG. 7 shows two object apertures 702 and two fasteners 704, there may be more or less depending on, for example, the size of the object, the weight of the object, etc. As a result, FIG. 8 is a perspective view showing the object bracket 200 (in outline) coupled to the object 700 of FIG. 7, according to certain aspects of the present disclosure.

Figure 9:
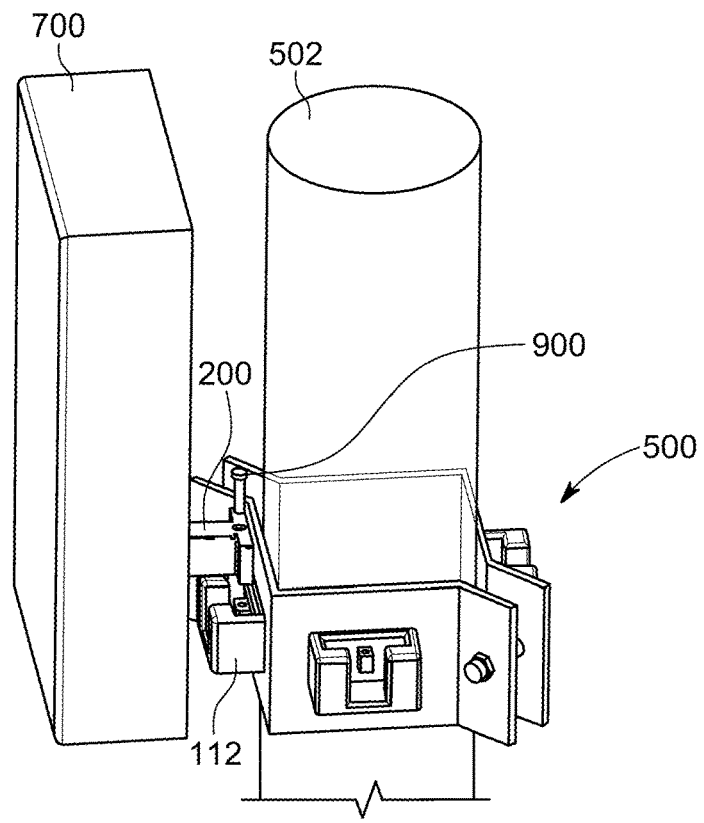
FIG. 9 is a perspective view showing an object being coupled to a pole mount kit, according to certain aspects of the present disclosure.

FIG. 9 is a perspective view showing an object 700 being coupled to a pole mount kit 500, according to certain aspects of the present disclosure. With the pole mount kit 500 attached to the pole 502, the object 700 coupled to the object bracket 200 can be coupled to the pole mount kit 500 by coupling the object bracket 200 to one of the retaining brackets 112. As described above, the object bracket 200 generally fits within the retaining area (122 in FIG. 1), and extends through cutout region (120 in FIG. 1), of the retaining bracket 112.

To further secure the object 700 and the object bracket 200 to the retaining bracket 112, a fastener 900, such as a nail, a screw, a bolt, etc., can pass through the object bracket aperture 216 (FIGS. 2-4) of the object bracket 200 and interface with the aperture 126 in the projection 124 of the retaining bracket 112 (FIG. 1). The fastener 900 helps to retain the object 700 and the object bracket 200 in the retaining bracket 112, in combination with the weight of the object 700 and the interference fit of the object bracket 200 fitting within the retaining area (122 in FIG. 1) of the retaining bracket 112.

Figure 10:
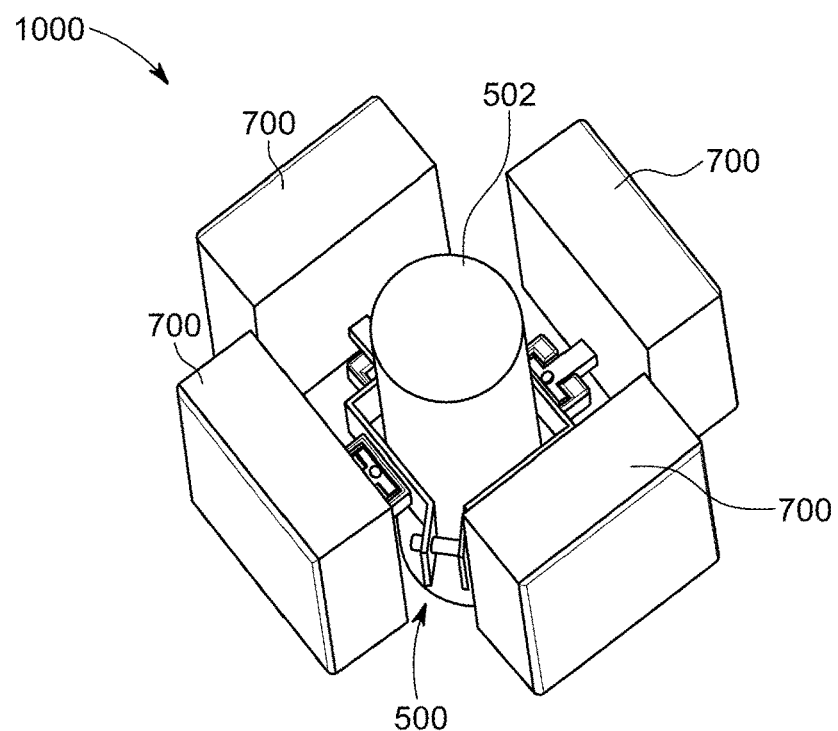
FIG. 10 is a perspective view showing a pole mount assembly coupled to a pole, according to certain aspects of the present disclosure.

FIG. 10 is a perspective view showing a pole mount assembly 1000 coupling four objects 700 to a pole, according to certain aspects of the present disclosure. Generally, the pole mount assembly 1000 includes the two pole mounts (100 in FIG. 1) coupled on opposing sides of the pole 502, together with the object brackets (200 in FIGS. 2-4) coupled to the respective objects 700, along with the various nuts and bolts (302 and 304, respectively, in FIGS. 5 and 6) and fasteners (704 and 900 in FIGS. 7-9) for coupling the two pole mounts (100 in FIG. 1) to the pole 502 and the objects 700 to the object brackets (200 in FIGS. 2-4) and retaining brackets (112 in FIG. 1).

With the pole mount assembly 1000, four objects 700 can be attached to a pole 502 using a single assembly. This is particularly beneficial in applications where multiple objects are required to be mounted on a single pole facing different directions for a combined 360° coverage, such as for remote radio units (RRUs) in telecommunications networks. A single pole mount assembly can be used for connecting one or more objects to a single pole, which the sole requirement for connecting more objects being the addition of object brackets for coupling the object to the pole mount assembly, rather than needing additional structure that is directly coupled to the pole.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A pole mount assembly comprising:
   at least one pole mount including:
      a mounting bracket including a pair of coupling plates and at least one retaining plate, the pair of coupling plates being coupled to opposite ends of the at least one retaining plate, the at least one retaining plate defining a mounting area between the pair of coupling plates; and
      at least two retaining brackets coupled to the at least one retaining plate, each of the retaining brackets including a base, opposing side walls extending from the base, and a front wall extending from the base, the front wall being located between the opposing side walls,
      wherein the base, the opposing side walls, and the front wall define a retaining area, the front wall defining a cutout region contiguous with the retaining area;
   four object brackets, each of the four object brackets including a back configured to cooperatively fit within the retaining area of one of the retaining brackets; and
   four objects, each of the four objects being coupled to a separate one of the four object brackets,
   wherein the at least one pole mount is coupled to another pole mount on opposite sides of a pole.

2. The pole mount assembly of claim 1, wherein each of the retaining brackets includes a projection extending into the retaining area, the projection including an aperture for accepting a fastener.

3. The pole mount assembly of claim 2, wherein the aperture is on a top face of the projection, the top face facing away from the base.

4. The pole mount assembly of claim 1, wherein the at least one retaining plate includes two retaining plates coupled together at first ends thereof, the two retaining plates being further coupled to respective ones of the pair of coupling plates at second ends thereof.

5. The pole mount assembly of claim 4, wherein the two retaining plates are coupled together at a 90° angle at the first ends.

6. The pole mount assembly of claim 1, wherein the pair of coupling plates are coplanar.

7. The pole mount assembly of claim 1, wherein each of the coupling plates includes an aperture for accepting a fastener therethrough.

8. A pole mount kit comprising:
   a pair of pole mounts, each of the pole mounts including:
      a mounting bracket including a pair of coupling plates and at least one retaining plate, the pair of coupling plates being coupled to opposite ends of the at least one retaining plate; and
      at least two retaining brackets coupled to the at least one retaining plate, each of the retaining brackets including a retaining area and a front wall cutout region;
   four object brackets, each of the four object brackets including a back configured to cooperatively fit within the retaining area of one of the retaining brackets, each of the four object brackets including an extension configured to cooperatively fit within and extend through the front wall cutout region of the one of the retaining brackets, the object bracket being seated in the one of the retaining brackets, the extension including an extension aperture to accept an object fastener for fastening an object to the object bracket; and four objects, each of the four objects being coupled to a separate one of the four object brackets, wherein the pair of pole mounts are coupled to each other on opposite sides of a pole.

9. The pole mount kit of claim 8, wherein:

each of the retaining brackets includes a projection extending into the area, the projection including a projection aperture to accept an object bracket fastener, and the back of each of the object brackets includes an object bracket cutout region, the object bracket cutout region accepting the projection of one of the retaining brackets when the object bracket is coupled to the one of the retaining brackets.

10. The pole mount kit of claim 9, wherein the back of each of the four object brackets includes a frame, a first side of the frame including the object bracket cutout region, a second side of the frame, opposite the first side, including an object bracket aperture for accepting the object bracket fastener.

11. The pole mount kit of claim 9, wherein the projection aperture is on a top face of the projection, the top face facing away from the base.

12. The pole mount kit of claim 8, wherein the at least one retaining plate of each of the pole mounts includes two retaining plates coupled together at first ends thereof and coupled to respective ones of the pair of coupling plates at second ends thereof.

13. The pole mount kit of claim 12, wherein the two retaining plates of each of the pole mounts are coupled together at a 90° angle at the first ends.

14. The pole mount kit of claim 8, wherein the pair of coupling plates of each of the pole mounts are coplanar.

15. The pole mount kit of claim 8, wherein each coupling plate of the coupling plates for each of the pole mounts includes a coupling plate aperture for accepting a fastener therethrough.

16. A pole mount assembly comprising:

a pair of pole mounts, each of the pole mounts including:

a mounting bracket including a pair of coupling plates and a least one retaining plate, the pair of coupling plates being on opposite ends of the at least one retaining plate, the at least one retaining plate defining a mounting area between the pair of coupling plates; and at least two retaining brackets coupled to the at least one retaining plate, each of the retaining brackets including:

a base, opposing side walls extending from the base, and a front wall extending from the base, the front wall being located between the opposing side walls, wherein the base, the opposing side walls, and the front wall define a retaining area, and the front wall defines a front wall cutout region contiguous with the retaining area;

four object brackets, each of the four object brackets including a back configured to cooperatively fit within the retaining area of one of the retaining brackets, each of the four object brackets including an extension configured to cooperatively fit within and extend through the front wall cutout region of one of the retaining brackets, with the object bracket seated in the one of the retaining brackets, the extension including an extension aperture to accept an object fastener for fastening an object to the object bracket; and four objects, each of the four objects being coupled to a separate one of the four object brackets, wherein the pair of pole mounts are coupled to each other on opposite sides of a pole.

17. The pole mount assembly of claim 16, further comprising two pairs of nuts and bolts, with each pair of the nuts and bolts coupling together opposing coupling plates of the pair of pole mounts around the pole.

18. The pole mount assembly of claim 16, further comprising a plurality of the object fastener, with each object fastener fastening one of the four objects to the separate one of the four object brackets.

19. The pole mount assembly of claim 16, further comprising a plurality of coupling plate fasteners, with each coupling plate fastener coupling one of the four object brackets to a separate one of the retaining brackets.

20. The pole mount assembly of claim 16, wherein the at least one retaining plate of each of the pair of pole mounts includes two retaining plates coupled together at first ends thereof and coupled to respective ones of the pair of coupling plates at second ends thereof, and the pole is positioned within an area formed by the retaining areas of the pair of pole mounts.

* * * * *